(12) United States Patent
Maeda et al.

(10) Patent No.: US 7,826,004 B2
(45) Date of Patent: Nov. 2, 2010

(54) LIQUID CRYSTAL DISPLAY DEVICE

(75) Inventors: Tsuyoshi Maeda, Yamanashi (JP); Toyokazu Ogasawara, Kanagawa (JP)

(73) Assignee: Sony Corporation, Tokyo (JP)

( * ) Notice: Subject to any disclaimer, the term of this patent is extended or adjusted under 35 U.S.C. 154(b) by 77 days.

(21) Appl. No.: 12/265,316

(22) Filed: Nov. 5, 2008

(65) Prior Publication Data
US 2009/0115935 A1    May 7, 2009

(30) Foreign Application Priority Data
Nov. 6, 2007    (JP)    ............................. 2007-288489

(51) Int. Cl.
    *G02F 1/1335*    (2006.01)
(52) U.S. Cl. ........................... 349/62; 349/61; 349/104; 349/130
(58) Field of Classification Search ................... 349/62, 349/61, 104, 106, 114, 165, 123, 130
See application file for complete search history.

(56) References Cited

U.S. PATENT DOCUMENTS 6,147,740 A * 11/2000 Yoshida et al. .............. 349/165

2005/0243245 A1* 11/2005 Taguchi et al. ................ 349/96
2006/0115608 A1*  6/2006 Saito et al. .................... 428/1.3
2007/0091229 A1*  4/2007 Jang et al. ...................... 349/96
2007/0268427 A1* 11/2007 Uehara .......................... 349/62
2009/0115935 A1*  5/2009 Maeda et al. .................. 349/62

FOREIGN PATENT DOCUMENTS

| JP | 10-293299 | 11/1998 |
|----|-----------|---------|
| JP | 1311-101964 | 4/1999 |
| JP | 1311-160538 | 6/1999 |
| JP | 2005-266800 | 9/2005 |

OTHER PUBLICATIONS

Japanese Patent Office Action corresponding to Japanese Serial No. 2007-288489 dated Oct. 20, 2009.

* cited by examiner

*Primary Examiner*—Brian M Healy
(74) *Attorney, Agent, or Firm*—Sonnenschein Nath & Rosenthal LLP

(57) ABSTRACT

There is provided a liquid crystal display device that includes a liquid crystal panel in a vertically aligned liquid crystal mode, a backlight source placed at the back of the liquid crystal panel to emit white light to the liquid crystal panel, and an optical film placed between the liquid crystal panel and the backlight source and containing dichroic dye aligned in a substantially perpendicular direction.

5 Claims, 4 Drawing Sheets

LIQUID CRYSTAL DISPLAY DEVICE

CROSS-REFERENCE TO RELATED APPLICATION

The present invention contains subject matter related to Japanese Patent Application JP 2007-288489 filed in the Japan Patent Office on Nov. 6, 2007, the entire contents of which being incorporated herein by reference.

BACKGROUND OF THE INVENTION

1. Field of the Invention

The present invention relates to a liquid crystal display device.

2. Description of the Related Art

A liquid crystal display device is widely used as a monitor of a personal computer or a portable device and for TV applications because of its various advantages such as low voltage, low power consumption and feasibility of thickness reduction, size reduction and screen size enlargement. Various modes have been proposed for a liquid crystal display device according to the orientation of liquid crystal of a liquid crystal material layer, such as: twisted nematic (TN) mode, in-plane switching (IPS) mode, optically compensatory bend (OCB) mode, vertically aligned (VA) mode and so on. Particularly, VA mode liquid crystal has received attention recently for its high contrast.

However, the VA mode liquid crystal has the drawback that a hue when observing the liquid crystal from the normal and a hue when observing the liquid crystal from a wide angle are different at black display.

To address this drawback, the technique disclosed in Japanese Unexamined Patent Application Publication No. 2005-266800 compensates a change in hue when observed from a wide angle at black display by controlling a retardation of a polarizing plate used in a liquid crystal panel.

SUMMARY OF THE INVENTION

In the liquid crystal display device disclosed in Japanese Unexamined Patent Application Publication No.2005-266800, however, it is difficult to compensate a change in hue when observed from a wide angle at white display.

In light of the foregoing, it is desirable to provide a novel and improved liquid crystal display device capable of reducing a change in hue when observed from a wide angle at white display.

According to an embodiment of the present invention, there is provided a liquid crystal display device that includes a liquid crystal panel in a vertically aligned liquid crystal mode, a backlight source placed at the back of the liquid crystal panel to emit white light to the liquid crystal panel, and an optical film placed between the liquid crystal panel and the backlight source and containing dichroic dye aligned in a substantially perpendicular direction.

The optical film may contain polymer liquid crystal aligned in the substantially perpendicular direction, and the dichroic dye may be added to the polymer liquid crystal aligned in the substantially perpendicular direction.

A wavelength of absorption maximum of the dichroic dye may be longer than 550 nm and shorter than 780 nm.

An absorption coefficient of the dichroic dye in a molecule long-axis direction may be larger than an absorption coefficient of the dichroic dye in a molecule short-axis direction.

It is preferred that a scattering means to scatter light transmitted through the optical film does not exist between the liquid crystal panel and the optical film.

An intensity of the white light to be absorbed by the optical film may be determined based on at least one of a content of the dichroic dye in the optical film and a light path length of the optical film.

According to another embodiment of the present invention, there is provided a method of reducing a change in hue in a liquid crystal display device including a liquid crystal panel in a vertically aligned liquid crystal mode, a backlight source placed at the back of the liquid crystal panel to emit white light to the liquid crystal panel, and an optical film placed between the liquid crystal panel and the backlight source and containing dichroic dye aligned in a substantially perpendicular direction. The method includes the steps of absorbing, by the dichroic dye, light in a prescribed range of the white light proceeding in a direction different from the substantially perpendicular direction, and inputting the white light, of which the light in the prescribed range has been absorbed, to the liquid crystal panel.

According to the embodiments of the present invention described above, it is possible to reduce a change in hue at white display when observed from a wide angle.

DETAILED DESCRIPTION OF THE PREFERRED EMBODIMENTS

Figure 1:
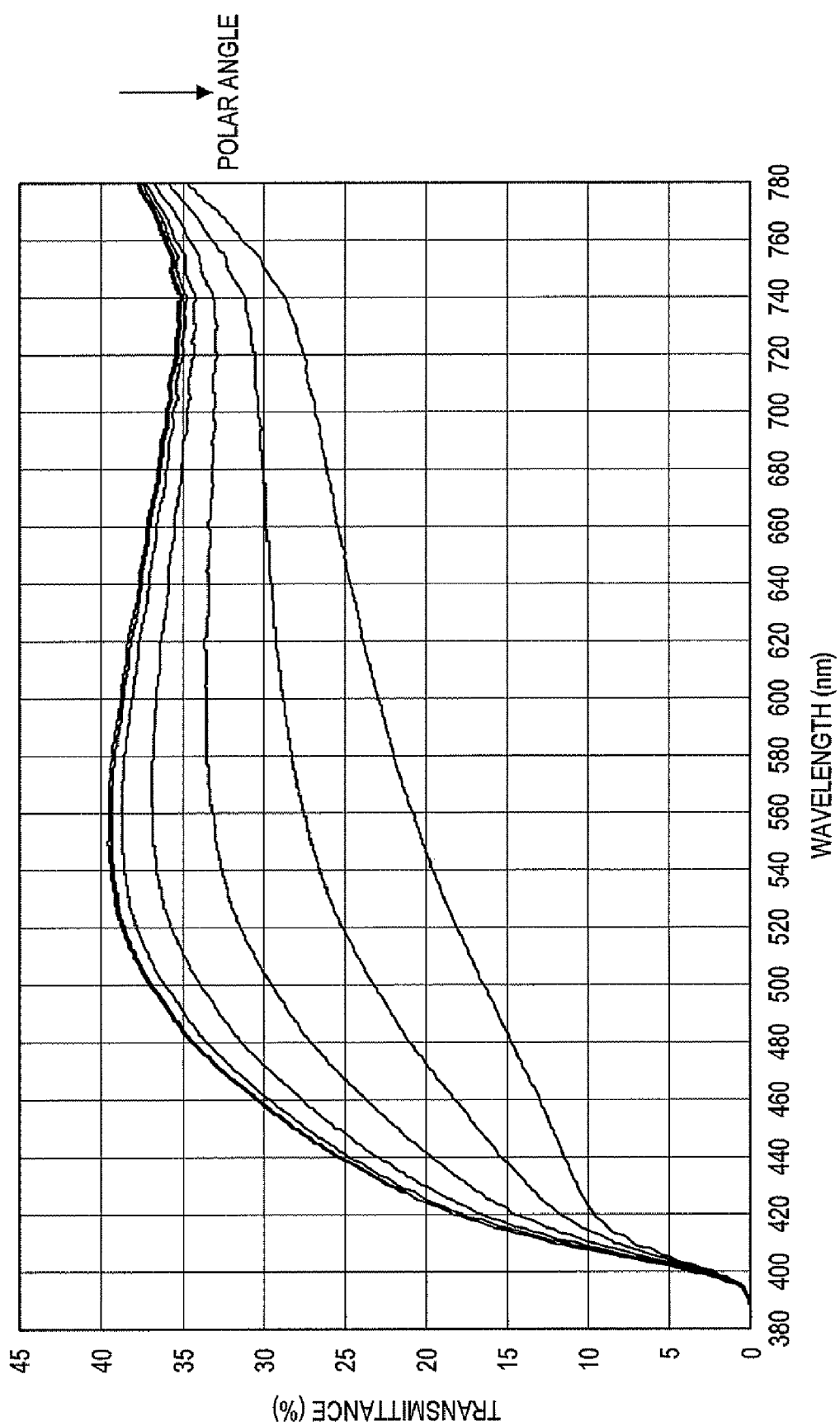
FIG. 1 is a graph illustrating the polar angle dependence of a hue in a liquid crystal display device according to a related art.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

Before describing a liquid crystal display device according to a first embodiment of the present invention, an issue of a liquid crystal display device according to a related art will be explained in detail with reference to FIG. 1. FIG. 1 is a graph illustrating the polar angle dependence of a hue in the liquid crystal display device according to the related art.

Figure 2:
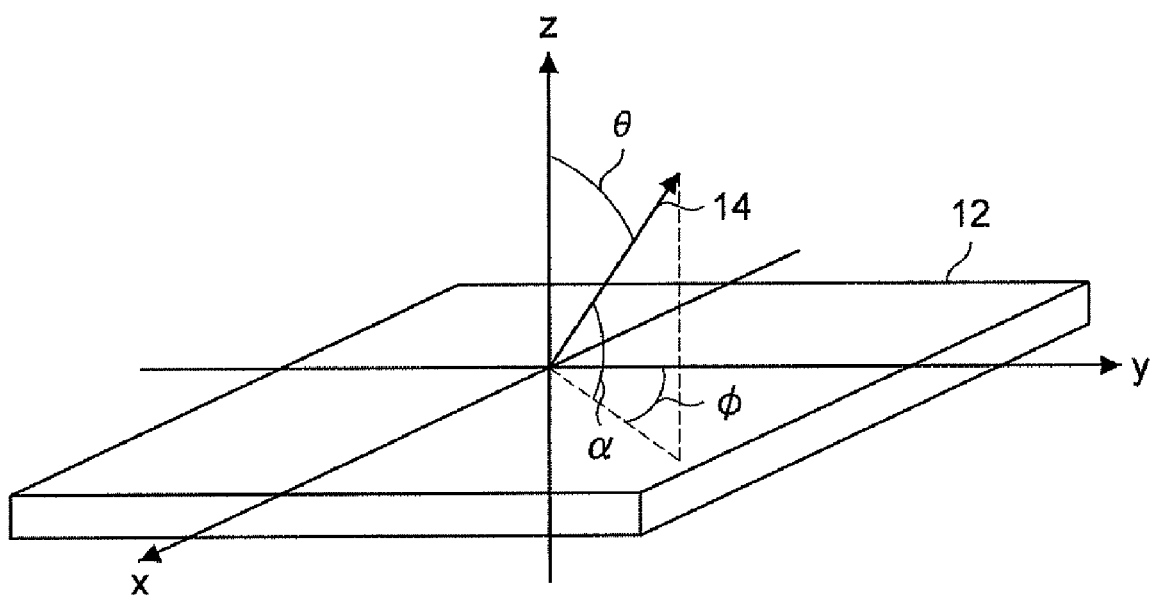
FIG. 2 is an explanatory view illustrating the definition of a coordinate system.

In the following description, the coordinate system as shown in FIG. 2 is used, in which one plane of a given substrate 12 is the x-y plane and a direction perpendicular to the substrate 12 is the z-axis direction. When a given vector 14 is defined, an angle θ between the vector 14 and the z-axis is defined as the polar angle, and an angle φ between the projection of the vector 14 onto the x-y plane and the y axis is defined as the azimuthal angle. The direction of the vector 14 in FIG. 2 is shown for convenience, and it may be a vector from the positive side to the negative side of the z-axis or a vector from the negative side to the positive side of the z-axis. The vector 14 may be in the molecule long-axis direction of a liquid crystal material or dichroic dye or in the direction of the line of sight when obliquely viewing the liquid crystal display device where the substrate 12 is the display surface of the liquid crystal display device.

FIG. 1 is a spectrum of white display when obliquely viewing the liquid crystal display device at an azimuthal angle of φ=45 degrees in the case where the display surface of the liquid crystal display device that employs the vertically aligned liquid crystal mode (VA mode) in which each pixel is divided into four domains corresponds to the substrate 12 in FIG. 2 and the direction of the line of sight corresponds to the vector 14 in FIG. 2. In FIG. 1, the horizontal axis indicates a wavelength, and the vertical axis indicates a transmittance. The spectrum shown in FIG. 1 is measured by varying an angle between the line of sight and the normal to the liquid crystal display device (i.e. the polar angle θ) 10 degrees each from 0 to 60 degrees. The spectrum when θ is 0 degree and the spectrum when θ is 10 degrees are substantially identical without any significant variation.

Referring to FIG. 1, as the polar angle θ increases, the transmittance in the blue wavelength range decreases, so that yellow becomes significant. Such a tendency is remarkable in the spectrum with the polar angle θ of 50 degrees. This result indicates that an observer recognizes a yellowish image even during white display when observing the liquid crystal display device in the vertically aligned liquid crystal mode from a wide angle, that is, a change in hue occurs when the liquid crystal display device is observed from a wide angle.

The inventor of the present invention has conducted intensive studies in order to overcome the above issue and has found the liquid crystal display device capable of reducing a change in hue at white display when observed from a wide angle.

<Structure of the Liquid Crystal Display Device According to the Embodiment>

Figure 3:
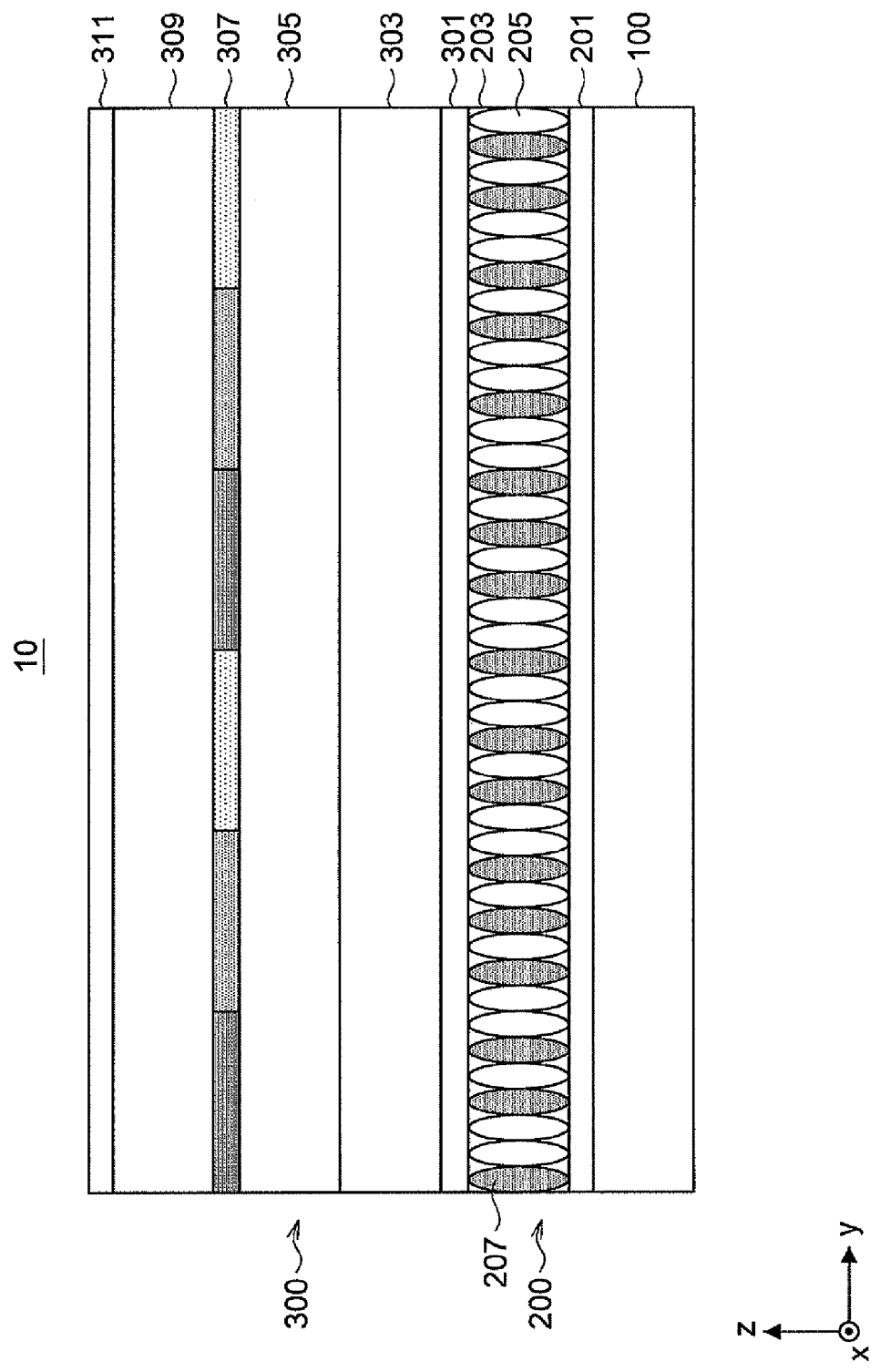
FIG. 3 is an explanatory view illustrating a liquid crystal display device according to a first embodiment of the present invention.
Figure 4:
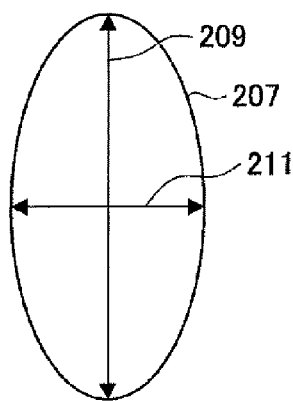
FIG. 4 is an explanatory view illustrating the axial direction of dichroic dye according to the first embodiment.
Figure 5:
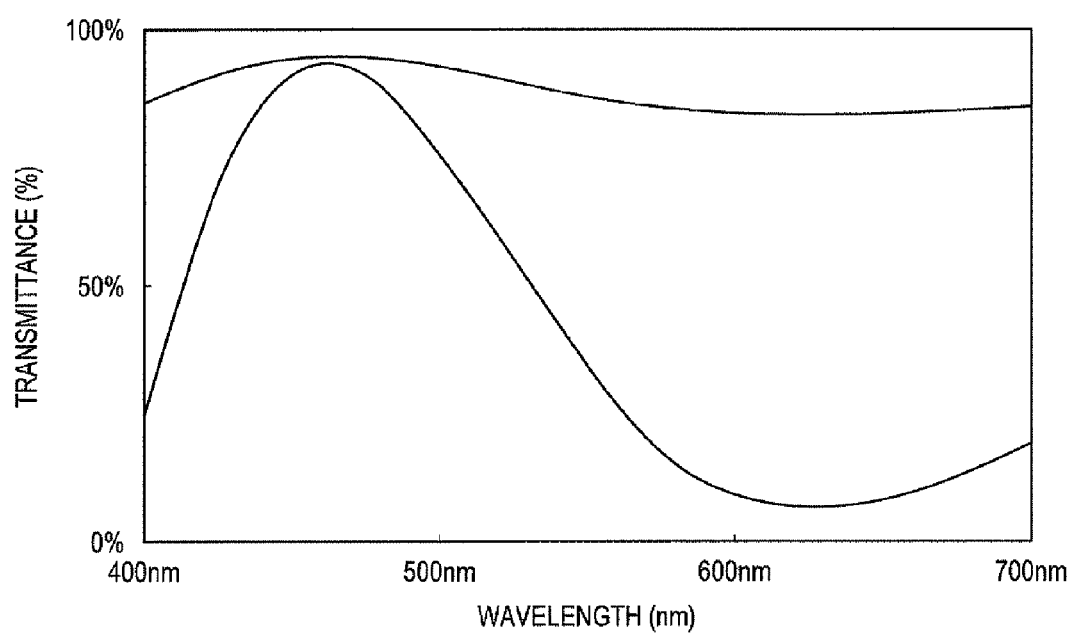
FIG. 5 is a spectrum showing an example of absorption characteristics of dichroic dye according to the first embodiment.

The structure of a liquid crystal display device 10 according to the embodiment is described hereinafter in detail with reference to FIGS. 3 to 5. FIG. 3 is an explanatory view illustrating he liquid crystal display device 10 according to the embodiment. FIG. 4 is an explanatory view illustrating the axial direction of dichroic dye according to the embodiment. FIG. 5 is a spectrum showing an example of absorption characteristics of dichroic dye according to the embodiment.

Referring to FIG. 3, the liquid crystal display device 10 according to the embodiment mainly includes a backlight source 100, an optical film 200 and a liquid crystal panel 300.

The backlight source 100 is a light emitting unit that emits white light, for example, to the optical film 200 and the liquid crystal panel 300, which are described later. As the backlight source 100 of this embodiment, a cold-cathode fluorescent lamp (CCFL), a flat fluorescent lamp (FFL), an electroluminescence (EL) element, a light emitting diode (LED) or the like may be used. The backlight source 100 of this embodiment, however, is not limited thereto, and any light source may be used as long as it is capable of emitting white light.

The optical film 200 is a member that is placed between the backlight source 100 and the liquid crystal panel 300, which is described later. The optical film 200 absorbs a part of white light that is emitted from the backlight source 100 and allows the white light that has been partly absorbed to be transmitted through the liquid crystal panel 300, which is placed on top of the optical film 200. The optical film 200 is described in detail later.

The liquid crystal panel 300 controls transmission/blocking of light that is emitted from the backlight source 100 and transmitted through the optical film 200 according to on/off of a voltage that is applied to an electrode (not shown) placed on the liquid crystal panel 300. The liquid crystal panel 300 mainly includes polarizing films 301 and 311, glass substrates 303 and 309, a liquid crystal material layer 305, and an optical filter 307, for example, as shown in FIG. 3. In the liquid crystal panel 300, pixels are arranged in planar fashion, and the liquid crystal panel 300 further includes an electrode (not shown) for applying a predetermined voltage to each pixel.

The polarizing film 301 is a film that controls the polarization of light that is transmitted through the optical film 200, and the polarizing film 311 is a film that controls the polarization of light that is output from the liquid crystal panel 300. In the polarizing films 301 and 311, the direction of the polarization axis of each polarizing film is determined according to the way of orientation of the liquid crystal materials that are used in the liquid crystal material layer 305, which is described later.

Further, one or two or more retardation films for compensating coloring of the liquid crystal material layer 305, which is described later, in the voltage-applied state may be placed respectively between the polarizing films 301 and 311 and the glass substrates 303 and 309. As the retardation film, a uniaxial optical film may be used, for example. An angle between the polarization axis of each uniaxial optical film and the x-axis shown in FIG. 3 may be a predetermined angle.

The glass substrates 303 and 309 are placed below and above the liquid crystal material layer 305, which is described later, to support the liquid crystal materials that form the liquid crystal material layer 305. The glass substrates 303 and 309 are formed using glass that contains a prescribed component. Further, an electrode (not shown) that is patterned using a prescribed metal, Indium-Tin Oxide (ITO) or the like is formed between the glass substrates 303 and 309 and the liquid crystal material layer 305.

In order to control the orientation of the liquid crystal materials that form the liquid crystal material layer 305, which is described later, so-called orientation processing may be performed on the surfaces of the glass substrates 303 and 309. Examples of the orientation processing are processing that, after forming an orientation film using polyimide or the like on the surfaces of the glass substrates 303 and 309, rubs the formed thin film in a predetermined direction (which is called rubbing) and processing that, after forming a light orientation film on the surfaces of the glass substrates 303 and 309, applies light with a prescribed wavelength onto the film. The orientation processing may be performed on the electrodes (not shown) that are formed on the surfaces of the glass substrates 303 and 309.

The liquid crystal material layer 305 is a film that is formed using prescribed liquid crystal materials. The liquid crystal materials that form the liquid crystal material layer 305 are aligned in a prescribed orientation. Not all of the liquid crystal materials are totally aligned in the same orientation, and the respective liquid crystal materials are aligned in a prescribed orientation on average. Such an average direction of orientation (specifically, a unit vector indicating an average direction of orientation) is referred to hereinafter as a director.

The liquid crystal display device 10 according to the embodiment is preferably a liquid crystal display device of the VA mode in which the director of the liquid crystal materials of the liquid crystal material layer 305 is substantially parallel to the vertical direction (the z-direction in FIG. 3). Further, the liquid crystal materials that form the liquid crystal material layer 305 according to the embodiment are preferably liquid crystal materials in which a dielectric constant in the molecule long-side direction is smaller than a dielectric constant in the molecule short-axis direction (i.e. liquid crystal materials with negative dielectric anisotropy).

Each pixel that constitutes the liquid crystal material layer 305 may be divided into two or four domains in order to improve viewing angle characteristics so as to prevent degradation of display quality when viewed obliquely. The multi-domain of the liquid crystal material layer 305 may be obtained by cutting a prescribed slit or forming a rib with a prescribed shape on the electrode placed on the glass substrates 303 and 309.

The optical filter 307 is placed on top of the liquid crystal material layer 305 (on the positive side of the z-axis in FIG. 3) and serves as a bandpass filter in the visible light range. In the optical filter 307, three kinds of micro color filters, which respectively transmit red light only, green light only and blue light only, are arranged in a prescribed planar array structure as shown in FIG. 3. The optical filter 307 is formed using coloring matter, pigment, dyestuff or the like which respectively absorb light with a prescribed wavelength.

(Structure of the Optical Film 200)

The optical film 200 is described in detail hereinbelow. The optical film 200 includes a base film 201 and a polymer liquid crystal layer 203 that is placed on top of the base film 201, for example, as shown in FIG. 3.

The base film 201 is a substrate of the optical film 200, and it may be a film made of a highly transparent, durable and non-birefringent material, for example. Examples of such a material include a triacetylcellulose (TAC) film, a film containing a norbornene compound and so on. The polymer liquid crystal layer 203 is placed on top of the base film 201.

In order to control the orientation of the polymer liquid crystal that forms the polymer liquid crystal layer 203, which is described later, it is preferred to perform so-called orientation processing on the surface of the base film 201. Examples of the orientation processing are processing that, after forming an orientation film using polyimide or the like on the surface of the base film 201, rubs the formed thin film in a predetermined direction (which is called rubbing) and processing that, after forming a light orientation film on the surface of the base film 201, applies light with a prescribed wavelength onto the film. The above-described orientation processing is performed on the base film 201 of this embodiment so that polymer liquid crystal 205 and dichroic dye 207 that are contained in the polymer liquid crystal layer 203 are aligned in a substantially vertical orientation.

The polymer liquid crystal layer 203 that is placed on top of the base film 201 includes the polymer liquid crystal 205 and the dichroic dye 207 as shown in FIG. 3. In FIG. 3, the polymer liquid crystal 205 and the dichroic dye 207 are schematically illustrated using substantially elliptical shapes.

The polymer liquid crystal 205 serves as a matrix that constitutes the optical film 200 according to the embodiment. In the polymer liquid crystal layer 203 according to the embodiment, the molecule long-axis direction of mesogen that forms the polymer liquid crystal 205 is aligned in a substantially vertical orientation with respect to the base film 201. Thus, the long axis of the substantially elliptical shape indicating each polymer liquid crystal 205 in FIG. 3 is in the mesogen molecule long-axis direction. In the optical film 200 according to the embodiment, light that is transmitted in the substantially perpendicular direction (the z-axis direction in FIG. 3) is preferably transmitted without being absorbed by the polymer liquid crystal 205. Therefore, an absorption coefficient in the mesogen molecule long-axis direction is preferably larger than an absorption coefficient in the mesogen molecule short-axis direction.

As the polymer liquid crystal 205 according to the embodiment, any material may be used as long as it is a compound in which the mesogen molecule long-axis direction can be aligned in the substantially perpendicular direction. The polymer liquid crystal 205 may be main-chain polymer liquid crystal in which the mesogen is contained in the main chain of the polymer or side-chain polymer liquid crystal in which the mesogen is contained in the side chain of the polymer. An example of the polymer liquid crystal 205 is a liquid crystalline polyester as described in Japanese Patent No. 3248037, for example.

The dichroic dye 207 is dye with light dichroism. In the dichroic dye 207 that is used in the optical film 200 according to the embodiment, an absorption coefficient $\alpha_{//}$ in the molecule long-axis direction 209 is larger than an absorption coefficient $\alpha_{\perp}$ in the molecule short-axis direction 211 in the visible light range when a dye molecule is illustrated in a substantially elliptical shape as shown in FIG. 4.

Further, the dichroic dye 207 that is used in the optical film 200 according to the embodiment is preferably blue dichroic dye in which the wavelength of absorption maximum exists in the range longer than 550 nm and shorter than 780 nm, for example, so as to strongly absorb light on the long wavelength side in the visible light range. The wavelength of 550 nm is a wavelength in close proximity to the maximum relative luminosity, and the use of dichroic dye that largely absorbs light with such a wavelength sacrifices the brightness of the liquid crystal display device due to light absorption, which is not desirable. On the other hand, if the wavelength of absorption maximum is longer than 780 nm, it is difficult to effectively absorb light in the visible light range, which is also not desirable. More preferably, the wavelength of absorption maximum of the dichroic dye 207 is equal to or longer than 580 nm, for example, in order to efficiently absorb yellow and orange light.

Further, it is preferred in the dichroic dye 207 that the wavelength dependence of a transmittance in the dichroic dye molecule long-axis direction 209 and the wavelength dependence of a transmittance in the dichroic dye molecule short-axis direction 211 are different as shown in FIG. 5, for example. In FIG. 5, the direction in which the wavelength dependence is small and light in the visible light range is transmitted at a high rate is the molecule short-axis direction 211, and the direction in which the wavelength dependence is large is the molecule long-axis direction 209.

As blue dichroic dye as described above, azo dye, anthraquinone dye or the like may be used, for example. As azo dye, blue dichroic dye as described in Japanese Patent No. 308671 or dye such as the following chemical formula 1 or 2 may be used, for example.

[Chemical formula 1]

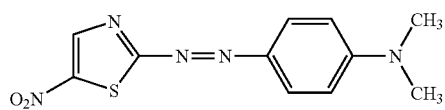

-continued

[Chemical formula 2]

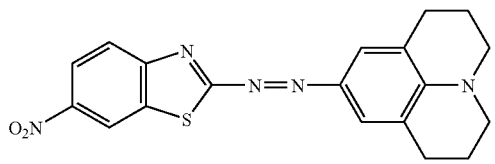

The optical film 200 according to the embodiment contains at least one kind of the above-described dichroic dye, and it may contain two or more kinds of dichroic dye. The dichroic dye that is added to the optical film 200 may be selected in any combination based on the wavelength and the amount of light to be transmitted by referring to the absorption characteristics of the dichroic dye and so on.

In the optical film 200 according to the embodiment, the dichroic dye 207 as described above and the polymer liquid crystal 205 are aligned vertically to the base film 201 (i.e. homeotropic alignment). As a result of the homeotropic alignment of the dichroic dye 207, the molecule long-axis direction 209 with a large wavelength dependence is vertical to the base film 201, and the molecule short-axis direction 211 with a small wavelength dependence is parallel to the base film 201.

If white light that proceeds in parallel to the z-axis direction in FIG. 3 is incident on the dichroic dye 207 that is aligned as described above, by the action the absorption coefficient $\alpha_\perp$ in the molecule short-axis direction 211, the incident white light proceeds, as being white light, in the z-axis direction in FIG. 3. If the white light that proceeds in parallel to the z-axis direction is incident on the liquid crystal panel 300, the white light is transmitted through the liquid crystal panel 300 as being white light. Therefore, when an observer views the liquid crystal display device 10 from the normal, the observer observes the white light.

On the other hand, when an observer views the liquid crystal display device 10 from a wide angle, the observer observes the light that has proceeded through the optical film 200 and the liquid crystal panel 300 obliquely. If white light is obliquely incident on the optical film 200, as the white light is light that proceeds toward a wider angle (i.e. light that proceeds in the direction in which the polar angle θ is larger), the effect of the absorption coefficient $\alpha_\perp$ in the molecule short-axis direction 211 decreases, and the effect of the absorption coefficient $\alpha_{//}$ in molecule long-axis direction 209 increases in the dichroic dye 207. As a result, light that is transmitted through the optical film 200 is absorbed by the dichroic dye 207 according to the absorption characteristics of the dichroic dye 207, so that the light that proceeds toward a wider angle becomes blue light. Because the light that proceeds toward a wider angle appears more yellowish in the VA mode liquid crystal panel 300, if the blue light that proceeds toward a wide angle is incident on the liquid crystal panel 300, white light is output from the liquid crystal panel 300 consequently. Therefore, when an observer views the liquid crystal display device 10 from a wide angle, the observer observes the white light as well.

In the optical film 200 according to the embodiment, the amount of white light to be absorbed by the optical film 200 is determined so as not to sacrifice the brightness of the liquid crystal display device 10 on which the optical film 200 is mounted. The amount of white light to be absorbed by the dichroic dye 207 may be determined by adjusting the concentration of the dichroic dye 207 to be added into the polymer liquid crystal 205 while maintaining the thickness of the optical film 200. Alternatively, the amount of white light to be absorbed by the dichroic dye 207 may be determined by adjusting the thickness of the optical film 200 while maintaining the concentration of the dichroic dye 207 to be added into the polymer liquid crystal 205 so as to change the light path length of white light that is transmitted through the optical film 200. Further alternatively, the amount of white light to be absorbed by the dichroic dye 207 may be determined by adjusting both of the amount of the dichroic dye 207 to be added and the thickness of the optical film 200.

It is preferred not to place a scattering means such as a scattering filter for scattering light that has transmitted through the optical film 200 between the optical film 200 and the liquid crystal panel 300. The use of such a scattering means causes blue light that has transmitted through the optical film 200 and proceeded toward a wider angle to be scattered due to the scattering means and cease to proceed toward a wider angle.

<Manufacturing Method of the Optical Film 200 According to the Embodiment>

An example of a manufacturing method of the optical film 200 according to the embodiment is described hereinafter in detail.

First, prescribed polymer liquid crystal and prescribed dichroic dye are dissolved in a prescribed solvent, thereby preparing a solution for forming the polymer liquid crystal layer 203. Next, on an isotropic film with no retardation such as TAC or norbornene film, after making the film surface hydrophobic, an orientation film such as vertical alignment polyimide is deposited and orientation processing is performed. As a result of such processing, the base film of the optical film 200 is obtained.

Then, on the base film where the orientation processing is done, the prepared solution is coated to form a film that contains the polymer liquid crystal and the dichroic dye. After that, ultraviolet light with a prescribed wavelength is applied to the film that contains the polymer liquid crystal and the dichroic dye, thereby curing the film. As a result of such processing, the polymer liquid crystal is aligned vertically to the base film and, upon the vertical alignment of the polymer liquid crystal, the dichroic dye is also aligned vertically to the base film.

The above-described manufacturing method is an example of the manufacturing method of the optical film 200 according to the embodiment, and another manufacturing method may be used as long as it allows the polymer liquid crystal and the dichroic dye to be aligned vertically to the base film.

<Change in Hue in the Liquid Crystal Display Device 10 According to the Embodiment>

The liquid crystal display device 10 that includes the optical film 200 according to the embodiment was produced, and an actual change in hue was measured.

First, dichroic dye of the chemical formula 1 and the chemical formula 2 were added, 5% each, to the liquid crystalline polyester that is described in Japanese Patent No. 3248037, so that a polymer liquid crystal layer was formed on a TAC film. Next, the optical film was placed on the rear side of a VA mode light crystal panel, and a change in hue of white display when observing the light crystal panel obliquely at 60 degrees (polar angle) was measured. The wavelength of absorption maximum of the dichroic dye used in the optical film was approximately 620 nm.

As a result, a change in hue Δxy in the liquid crystal display device 10 according to the embodiment was 0.010, while a change in hue Δxy in a liquid crystal display device in which the optical film according to the embodiment was not placed was 0.043.

This result shows that the use of the optical film according to the embodiment reduces a change in hue of white display when observed obliquely at 60 degrees (polar angle) to ¼ or less compared with the related art.

Further, a diffusing film with a haze of 90% was placed between the above-described optical film and the rear side polarizing film of the liquid crystal panel, and a change in hue was measured in the same manner. As a result, an obtained change in hue Δxy was 0.039.

It should be understood by those skilled in the art that various modifications, combinations, sub-combinations and alterations may occur depending on design requirements and other factors insofar as they are within the scope of the appended claims or the equivalents thereof.

For example, although the case where the polymer liquid crystal of the optical film 200 is formed as a matrix is described in the above-described embodiment, the liquid crystal that is used in the optical film 200 may be monomeric liquid crystal as long as it is capable of homeotropic alignment.

What is claimed is:

1. A liquid crystal display device comprising:
    a liquid crystal panel in a vertically aligned liquid crystal mode;
    a backlight source placed at the back of the liquid crystal panel, to emit white light to the liquid crystal panel; and
    an optical film placed between the liquid crystal panel and the backlight source and containing a dichroic dye aligned in a substantially perpendicular direction,
    wherein,
        an intensity of the white light to be absorbed by the optical film is determined based on at least one of a content of the dichroic dye in the optical film and a light path length of the optical film.

2. The liquid crystal display device according to claim 1, wherein
    the optical film contains polymer liquid crystal aligned in the substantially perpendicular direction, and
    the dichroic dye is added to the polymer liquid crystal aligned in the substantially perpendicular direction.

3. The liquid crystal display device according to claim 1, wherein
    a wavelength of absorption maximum of the dichroic dye is longer than 550 nm and shorter than 780 nm.

4. The liquid crystal display device according to claim 1, wherein
    an absorption coefficient of the dichroic dye in a molecule long-axis direction is larger than an absorption coefficient of the dichroic dye in a molecule short-axis direction.

5. The liquid crystal display device according to claim 1, wherein
    the display device does not include a scattering unit to scatter a light transmitted through the optical film between the liquid crystal panel and the optical film.

* * * * *